Figure 1:
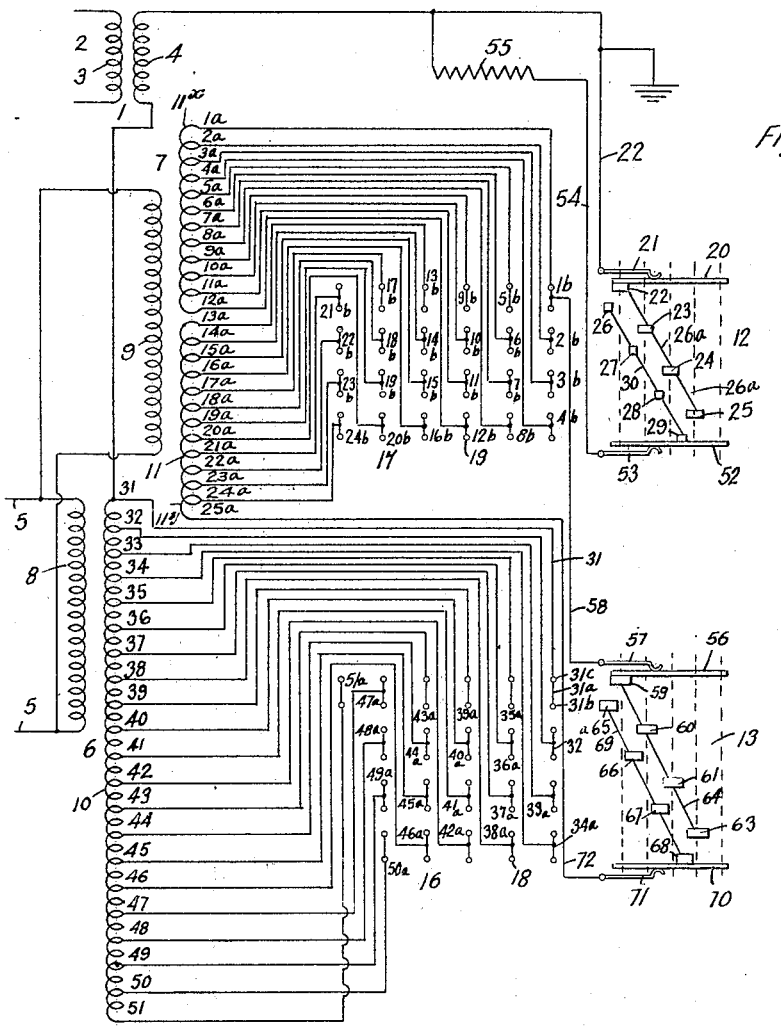

E. LEHR.
CONTROLLER FOR TRANSFORMERS.
APPLICATION FILED MAR. 7, 1916.

1,326,354.

Patented Dec. 30, 1919.
3 SHEETS—SHEET 1.

WITNESSES:
Fred H Miller
Geo. W. Hansen.

INVENTOR
Edwin Lehr
BY
Wesley G Carr
ATTORNEY

E. LEHR.
CONTROLLER FOR TRANSFORMERS.
APPLICATION FILED MAR. 7, 1916.

1,326,354.

Patented Dec. 30, 1919.
3 SHEETS—SHEET 2.

WITNESSES:
Fred H. Miller
Geo. W. Hansen

INVENTOR
Edwin Lehr
BY
Wesley G. Carr
ATTORNEY

E. LEHR.
CONTROLLER FOR TRANSFORMERS.
APPLICATION FILED MAR. 7, 1916.

1,326,354.

Patented Dec. 30, 1919.
3 SHEETS—SHEET 3.

WITNESSES:
Fred H Miller
Geo. W. Hansen.

INVENTOR
Edwin Lehr
BY
Wesley G Carr
ATTORNEY

UNITED STATES PATENT OFFICE.

EDWIN LEHR, OF PITTSBURGH, PENNSYLVANIA, ASSIGNOR TO WESTINGHOUSE ELECTRIC AND MANUFACTURING COMPANY, A CORPORATION OF PENNSYLVANIA.

CONTROLLER FOR TRANSFORMERS.

1,326,354.   Specification of Letters Patent.   Patented Dec. 30, 1919.

Application filed March 7, 1916. Serial No. 82,625.

*To all whom it may concern:*

Be it known that I, EDWIN LEHR, a citizen of the United States, and a resident of Pittsburgh, in the county of Allegheny and State of Pennsylvania, have invented a new and useful Improvement in Controllers for Transformers, of which the following is a specification.

My invention relates to voltage regulating systems employing transformers having stationary coils that are provided with a plurality of taps and controllers associated therewith for varying the circuit connections of the taps to the transformer windings.

More particularly, my invention relates to voltage regulating systems comprising alternating-current transformers and controllers associated therewith, the latter being of such construction that wide ranges of voltages, with very small variations in the values of the voltages, may be obtained.

Heretofore, it has been common to regulate and vary an alternating-current voltage by means of a regulating transformer which comprised a plurality of winding-sections formed by taps regularly spaced on the transformer winding and using an induction potential regulator in parallel to the individual winding-sections of the regulating transformer to give a smooth and gradual change in the voltages as the circuit connections to the regulating transformer winding were varied from one tap to another. Because of the limited range of variations in voltage that can be effected by an induction potential regulator, the auxiliary transformer was, of necessity, provided with a very large number of sections, each individual section effecting a very limited change in the voltage impresed upon the regulated circuit, because of the voltage-range restriction imposed by the induction potential regulator.

To overcome this difficulty, I substitute for the induction potential regulator an auxiliary transformer having windings that are provided with a plurality of taps, and I associate the windings of both the main and the auxiliary transformer controlling means whereby the circuit connections of the auxiliary and the regulating transformer windings may be expeditiously effected. Moreover, by employing my invention, a very wide range of voltages may be obtained and, at the same time, gradual changes therein may be made. The controlling means by which the circuit connections of the windings are varied, permits the several winding-sections of the regulating transformer to be successively connected in circuit in order to secure a wide range of variation in the voltages. The various winding-sections of the auxiliary transformer, however, are connected successively in circuit with each individual winding-section of the regulating transformer in order to secure small and gradual changes in the voltages. To this end, the present invention is adapted which allows a simplification of the switching mechanism heretofore employed and provides an economical and efficient regulating system which may be employed for securing a wide range of voltages for testing purposes or the like.

Figure 2:
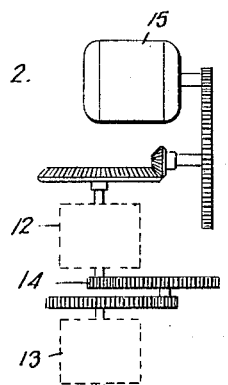
Figure 3:
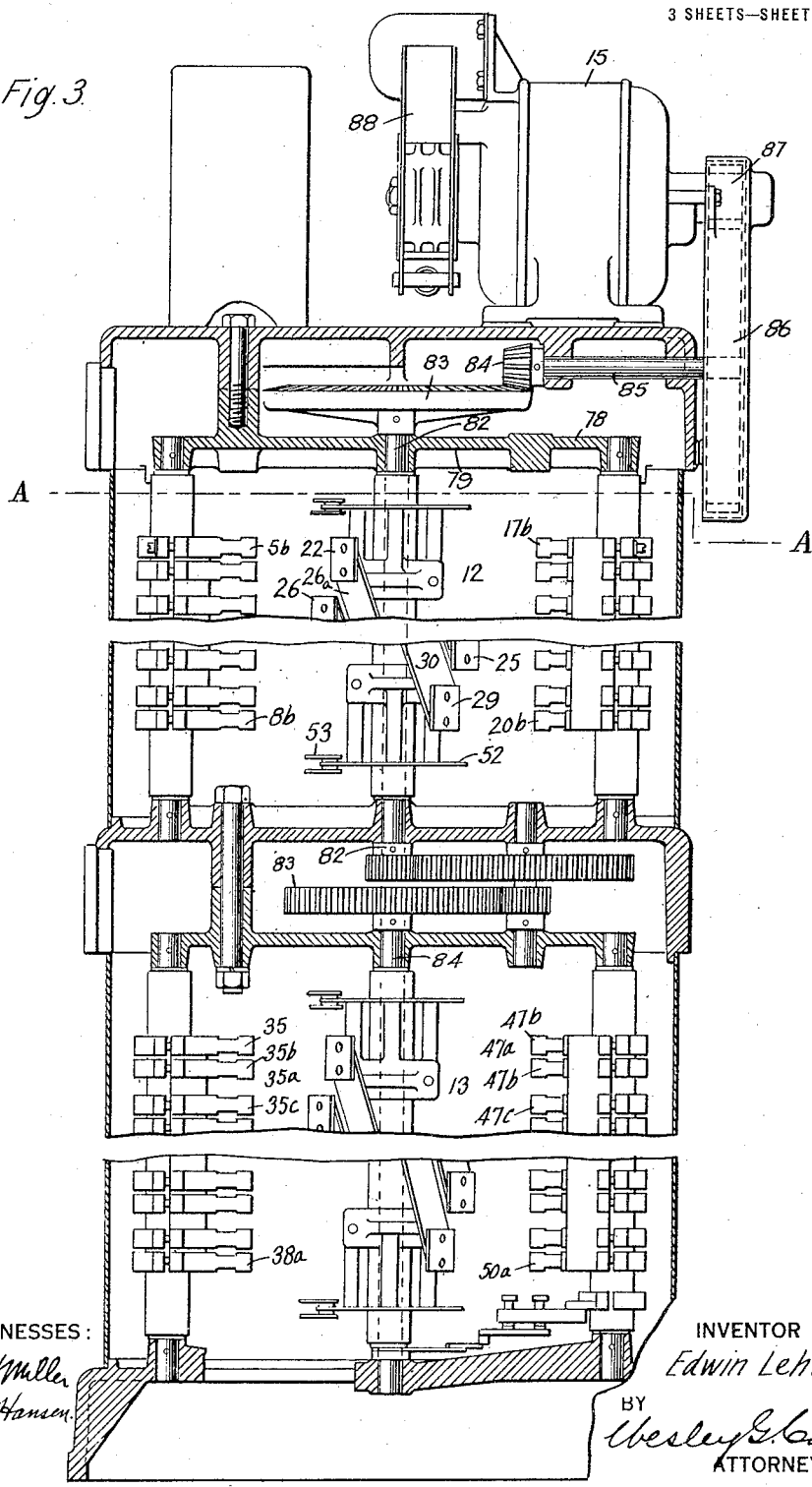
Figure 4:
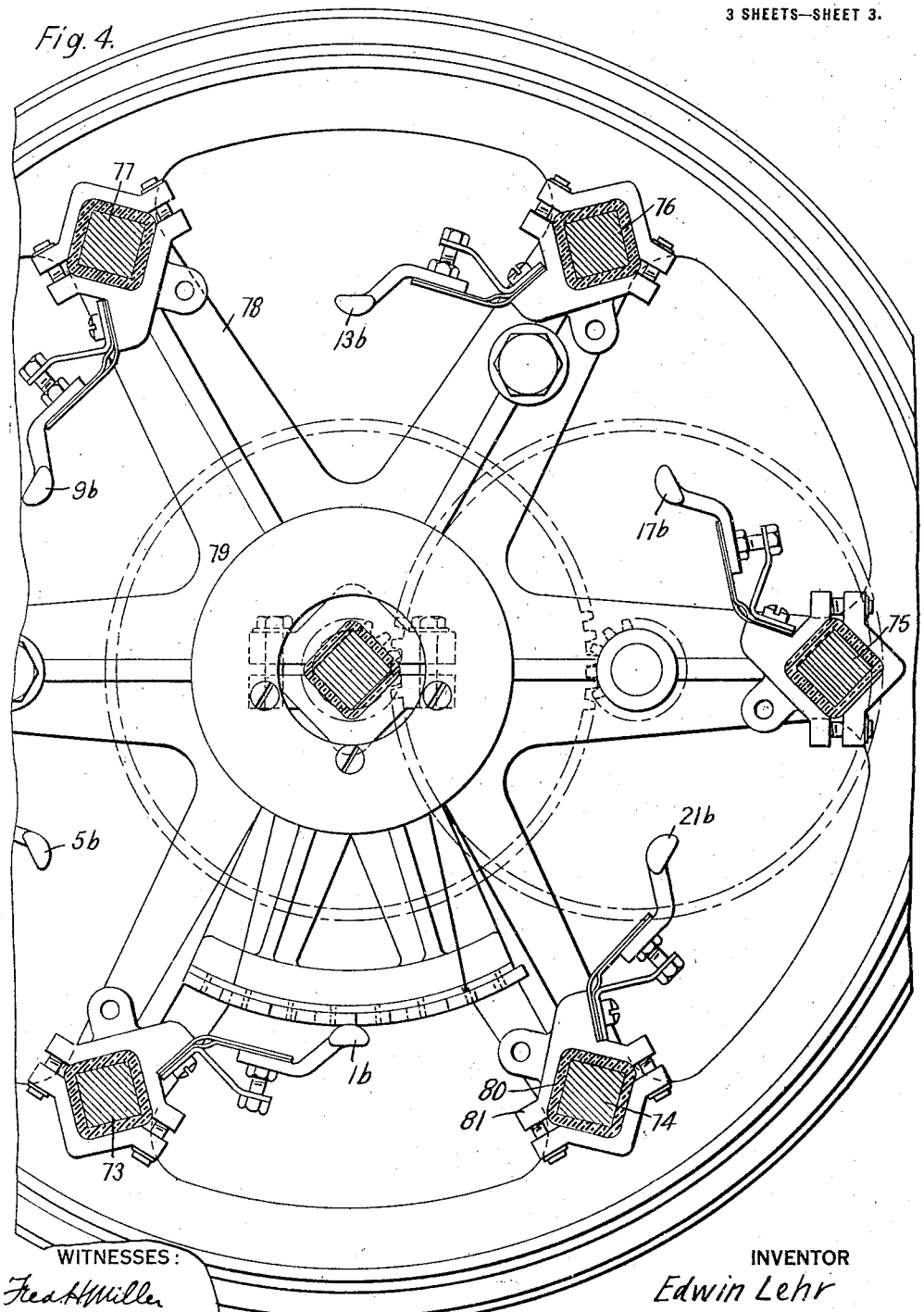

For a better understanding of the nature and scope of my invention, reference may be had to the following description and the accompanying drawings in which Figure 1 is a diagrammatic view of my voltage regulating system showing the electrical connections embodied in a voltage-regulating transformer and the associated auxiliary transformer, in addition to a controller coöperating therewith; Fig. 2 is a diagrammatic representation of a portion of a controller embodying a form of my invention, which shows the mechanical interconnection and speed-modifying means for the several drums thereof; Fig. 3 is a view, partially in section and partially in elevation, of a controller built in accordance with my invention, and Fig. 4 is a plan view, taken along the line A—A' of the controller of Fig. 3.

For the purpose of illustration, I have shown my voltage-regulating system associated with a testing transformer 1, a testing circuit 2 being connected through a secondary winding 3 which is in inductive relation to a primary winding 4, the voltages impressed upon the latter being regulated by means of my regulating apparatus Electrical supply mains 5 furnish electrical energy to a main or regulating transformer 6 and an auxiliary transformer 7, the said transformers comprising primary windings 8 and 9, respectively, which are connected in parallel relationship across the common mains 5. A secondary winding 10 of the transformer 6 comprises winding-sections formed by a plurality of taps which are preferably equally spaced from one another. Thus, by dividing the secondary winding 10 into sections having a large number of convolutions, wide ranges of voltage variations may be obtained. A secondary winding 11 of the transformer 7 comprises two independent sections 11$^x$ and 11$^y$, each having a plurality of sections which are formed by taps that are preferably equally spaced from one another. The secondary winding 11 is employed for effecting the gradual changes in the voltages to be impressed upon the primary winding 4 of the testing transformer 1, and, to this end, the sections of the auxiliary secondary winding 11 are to be successively connected in circuit with each of the winding sections of the regulating secondary winding 10, thereby providing means for securing gradual changes in the voltages over an extremely wide range.

To effect the circuit connections above mentioned so as to secure different voltages for exciting the testing transformer, I have invented a controller which will be hereinafter explained but which is here diagrammatically illustrated as consisting of two drums which are shown in development at 12 and 13. The drum 12 is adapted to vary the circuit connections of the secondary winding 11 and the drum 13 to vary the circuit connections of the secondary winding 10, both of said drums, for convenience, having their axes in alinement and being mechanically interconnected to each other through a gear train or speed modifying means shown at 14 in Fig. 2. A propelling device or motor 15 is employed to rotate the drums which rotate at different speeds by reason of the interposed gear train 14. Since the wide variations in the voltages are to be effected by varying the circuit connections of the secondary winding 10, the drum 13 is adapted to rotate at a slower speed than the drum 12 which successively connects each of the winding-sections of the secondary winding 11 in circuit with each winding section of the secondary winding 10. Therefore, the gear train 14 constitutes a speed-reduction means whereby the drum 12 rotates at a higher rate of speed than the drum 13.

My controller also comprises a plurality of groups 16 and 17 of stationary contact fingers 18 and 19, respectively, the former being connected to the taps of the secondary winding 10 and the latter being connected to the taps of the secondary winding 11. In this particular instance, the contact fingers 19 are arranged in six groups of four contact fingers each, while the fingers 18 are arranged in five such groups, and a sixth group comprising a single finger, the several groups being represented in the drawing by the vertically arranged contact fingers. The controller-drum 13 is adapted to coact with the contact fingers 18, and the drum 12 is adapted to coact with the contact fingers 19, as will be hereinafter explained. The selected sections of the regulating transformer winding 10 and the auxiliary transformer winding 11 are connected in series with each other and in parallel-circuit relationship with the primary winding 4 of the testing transformer 1, the voltages impressed thereupon being varied by varying the active winding-sections of the transformer windings 10 and 11. The taps and terminals 31 to 51, inclusive, of the main or regulating transformer winding 10 are respectively connected to contact fingers 31$^a$ to 51$^a$, inclusive, as shown. Similarly, the terminals and taps 1$^a$ to 25$^a$, inclusive, of the winding 11 are respectively connected to contact fingers 1$^b$ to 24$^b$, inclusive, and the contact member 71.

The controller 12 comprises an upper slip ring 20 which slidingly engages a contact member 21 that, in turn, is connected through a conductor 22 to the primary winding 4 of the testing transformer 1. A plurality of contact strips 22, 23, 24 and 25, all being connected to one another through connectors 26$^a$ and arranged on the drum 12 to successively engage the contact fingers 1$^b$, 2$^b$, 3$^b$ and 4$^b$, respectively, are connected to the slip ring 20. Other contact strips 26, 27, 28 and 29, which are likewise adapted to engage in succession the contact fingers 1$^b$, 2$^b$, 3$^b$ and 4$^b$, respectively, are connected to one another through conductors 30 and to a second slip ring 52, the latter, in turn, being connected, through a contact member 53 and a conductor 54, to a limiting resistor 55. The limiting resistor 55 is also connected to a terminal of the primary winding 4, as shown.

The control drum 13 comprises a slip ring 56 which slidingly engages a contact member 57 that, in turn, is connected through a conductor 58 to the stationary contact member 1$^b$ associated with the drum controller 12. Contact strips 59, 60, 61 and 63 are connected to one another through conductors 64 to the slip ring 56 and are arranged on the drum 13 in order to successively engage the contact fingers 31$^a$, 32$^a$, 33$^a$ and 34$^a$, respectively. Other contact strips 65, 66, 67 and 68 are connected to one another through conductors 69 and a second slip ring 70, a contact member 71, and a conductor 72 to the terminal 25$^a$ of the secondary winding 11. The stationary contact fingers 31$^a$ to 51$^a$, inclusive, which are associated with the drum controller 13 are, as mentioned above, arranged in groups that are peripherally spaced from one another, as will be explained in connection with Figs. 3 and 4. The several groups comprise vertically-alined contact members, one of said groups comprising the contact fingers $31^a$, $32^a$, $33^a$ and $34^a$; another group comprising the contact fingers $35^a$, $36^a$, $37^a$ and $38^a$; a third group comprising the contact fingers $39^a$, $40^a$, $41^a$ and $42^a$; a fourth group comprising the contact fingers $43^a$, $44^a$, $45^a$ and $46^a$; a fifth group comprising the contact fingers $47^a$, $48^a$, $49^a$ and $50^a$, and a sixth group comprising the contact finger $51^a$. In a similar manner, the contact fingers associated with the drum controller 12 are arranged in six groups of four contact fingers each, the said groups being correspondingly peripherally spaced with the aforementioned groups associated with the drum controller 13. The drum controllers 12 and 13 are, in this instance, so designed that their peripheries constitute substantially a sixty-degree segment of a circle since each of the contact strips of both drums engage, in succession, the contact fingers comprising each group. For instance, the contact strips 59, 60, 61 and 63 first engage, in succession, the contact fingers $31^a$, $32^a$, $33^a$ and $34^a$, respectively. On further rotation of the drum, the same contact strips engage, in succession, the contact fingers $35^a$, $36^a$, $37^a$ and $38^a$ comprising the second group, as mentioned above. The drum controller 13, being further advanced, will effect engagement between the aforementioned contact strips and the contact fingers $39^a$, $40^a$, $41^a$ and $42^a$, respectively, and so on. In this manner, increasing or decreasing amounts of the winding 10 are connected in circuit with the primary winding 4 of the testing transformer 1, the whole winding 10 being connected across the primary winding 4 when the contact finger $51^a$ engages the contact strip 59 on the drum 13 which marks the limit of rotation of the drum.

The auxiliary winding $11^x$ has its upper terminal $1^a$ connected to a contact finger $1^b$ of the controller 12 and to the slip ring 56 of the control drum 13 and the allied winding $11^y$ has its lower terminal $25^a$ connected to the slip ring 70 of the control drum 13. The intermediate taps of the winding 11 are connected to the stationary contact fingers, as hereinbefore mentioned, and various portions of the winding 11 are rendered active by rotating the drum 12, the contact strips 22, 23, 24 and 25 and the other contact strips 26, 27, 28 and 29 engaging, in succession, all of the fingers comprising each group 17 and then engaging all of the separate groups 17 in succession, in a manner similar to the action of the drum controller 13 and its associated contact fingers.

Since all of the sections of the auxiliary winding 11 are to be connected in circuit successively with each separate section of the regulating winding 10, the gear train 14, mechanically interconnecting the two drums 12 and 13, is adapted to effect a speed reduction so that the drum 13 will rotate one twenty-fourth as fast as the speed of rotation of the drum 12. The speed reduction of 24 to 1 is selected because the auxiliary winding 11 is divided into 24 sections, each section being connected successively in circuit with each successive section of the regulating winding 10. To illustrate, assume that the motor 15 is energized to effect rotation of the drums 12 and 13 in the proper direction, as hereinbefore mentioned. Referring to the drum 13, the contact strip 65 will first engage a member $31^b$ of the contact finger $31^a$. The terminal 31 of the winding 10 will, therefore, be connected through the contact strip 65, the slip ring 70, the contact member 71 and the conductor 72 to the terminal $25^a$ of the winding $11^y$. The terminal $1^a$ of the independent winding $11^x$ will be connected through the contact finger $1^b$ and the contact strip 26 of the drum controller 12 to one terminal of the resistor 55 which serves as a current-limiting resistance for limiting the current flow during the subsequent switching operations. Moving the drums 12 and 13 a slightly farther distance, the contact strip 65 will disengage the contact member $31^b$, and the contact strip 59 will engage the stationary contact member $31^c$. The terminal 31 of the winding 10 will then be directly connected through the slip ring 56, the contact member 57 and the conductor 58 to the contact finger $1^b$ which is now directly connected through the contact strip 22 to one terminal of the primary winding 4 of the testing transformer 1. Rotating the drums 12 and 13 to advance the drum 12 another step, the following circuit connections are effected: The contact strip 22 of the drum controller 12 disengages the contact finger $1^b$, and the contact strip 27 first engages the contact finger $2^b$ in order to connect the limiting resistor 55 in circuit. Subsequently, the contact member 23 will engage the stationary contact finger $2^b$, thereby connecting the first section of the auxiliary winding 11 to the terminal 31 of the regulating transformer winding 10. The smallest voltage, namely, that of the winding section between the taps $1^a$ and $2^a$ of the winding $11^x$, is now impressed upon the primary winding 4 of the testing transformer 1. A further rotation of the drum 12 connects, in succession, the stationary contact member $3^b$ and the stationary contact member $4^b$, thereby connecting the portion of the transformer winding $11^x$ that extends between the taps $1^a$ and $4^a$ across the primary winding 4. This operation is continued to successively connect the portions of the winding 11 that extend between succeeding taps across the primary winding 4. After the entire winding 11 is connected across the primary winding 4, the control drum 13 is then in a position to connect the tap 32 of the main winding 10 in circuit. This connection is not effected until 24 points have been advanced on the control drum 12 since the speed reduction between the control drums 12 and 13 is a 24 to 1 ratio. In this position, the contact strip 60 is connected to the contact finger 32ª, and the control drum 12 repeats the operations mentioned above to connect successive sections of the winding 11 to the tap 32 of the main transformer winding 10. This series of operations is continuously repeated until the contact strip 59 of the controller 13 engages the stationary contact finger 51ª which comprises the sixth group of the peripherally-spaced groups of stationary contact fingers. In this position, a limiting switch (not shown) of any of the well known types may be employed for disconnecting the motor 15 from circuit, thereby precluding further rotation of the drums 12 and 13.

From the foregoing explanation, it will be noted that the sections of the winding 10 are successively connected in circuit with the primary winding 4 of the testing transformer 1, and the sections of the auxiliary winding 11 are connected, in succession, with each of the aforementioned sections of the winding 10. In this manner, a very wide range of voltage regulation is provided and also slight variations therein are made, the former being accomplished by the main winding 10 and the latter by the auxiliary winding 11.

In Figs. 3 and 4, I have employed the same numerals to designate the corresponding elements of Fig. 1 wherever feasible, these figures illustrating the structural details of my controller which effect the circuit connections hereinbefore described in connection with Fig. 1. The peripherally-arranged groups of contact fingers are mounted in alinement upon posts 73, 74, 75, 76 and 77, and another post (not shown) which are equally spaced from one another and supported by arms 78 of a cast iron spider 79. The contact fingers mounted upon each post are insulated therefrom by means of square insulating coverings 80 which are embraced by clamping devices 81 to which the contact fingers are secured, substantially as shown. The contact fingers are, therefore, arranged in six peripherally-spaced groups which are successively engaged by the contact strips mounted upon the drums 12 and 13. The drum 12 is mounted upon a shaft 82, the upper end of which is connected to a beveled gear 83 that, in turn, is rotated by a coacting gear 84 rigidly mounted upon a shaft 85 with a gear 86. The gear 86 is connected to a spur gear 87 which is directly mounted upon the shaft of the motor 15. The motor 15 is provided with a magnetic brake 88 of a well-known type of construction such as is usually associated with all motors operating induction voltage regulators. The lower end of the shaft 82 is connected, through a train of gears 83, to the upper end of a rotatable shaft 84 upon which the drum 13 is mounted.

The drum 12 comprises the contact strips 22, 23, 24 and 25 which are interconnected by means of the conducting strip 26ª, and also contact strips 26 to 29, inclusive, which are mounted upon the conducting strip 30. The contact strips 26ª and 30, which are arranged in the form of segments of helices are shown in Figs. 3 and 4, where it will be noted that they subtend an arc having a peripheral length equal to that extending between adjacent and peripherally-spaced groups of the stationary contact fingers. It will be noted, therefore, that all of the contact strips mounted on both drums engage, in succession, the several stationary contact fingers comprising the separate groups. In this manner, a multiplicity of circuit connections, such as are necessary for employing my regulating system, is easily effected in a simple manner and with a controller that is relatively simple and economical to construct.

While I have shown and described one embodiment only of my invention and one controller only for effecting the necessary circuit connections, it will be understood that many modifications may be made therein without departing from the spirit and scope of the appended claims.

I claim as my invention:

1. A controller comprising a plurality of spaced columns of contact fingers, a rotatable drum having contact strips mounted thereon and adapted to coact with said contact fingers, and means whereby all the contact strips of the drum successively engage the several columns of the stationary contact fingers.

2. A controller comprising a plurality of spaced groups of contact fingers, a rotatable drum having contact strips which are adapted to coact with the contact fingers, and means whereby all the contact strips may successively engage the contact fingers of one group and then engage the contact fingers of a succeeding group.

3. A controller comprising a plurality of spaced groups of contact fingers, a rotatable drum having contact strips which are arranged to coact with the contact fingers, and means whereby all the contact strips of the drum engage the separate groups of contact fingers in succession.

4. A controller comprising a plurality of spaced groups of alined and insulated contact fingers, a rotatable drum having contact strips which are arranged to engage said contact fingers, and means for rotating said drum whereby all of said contact strips may engage in succession the contact fingers of the separate groups.

5. A controller comprising a plurality of peripherally-spaced groups of contact fingers, a rotatable drum having contact strips which are arranged to engage said contact fingers, and means for rotating said drum to effect engagement between the contact strips and the contact fingers of the separate groups in succession.

6. A controller comprising a plurality of peripherally-spaced groups of contact fingers, a plurality of rotatable drums having contact strips mounted thereon to coact with said contact fingers, each of said drums coöperating with separate groups of contact fingers, speed-modifying means interposed between the several drums, and means for rotating said drums whereby each effects engagement with its selected contact fingers at a different rate of speed.

7. A controller comprising a plurality of groups of contact fingers, a plurality of rotatable drums having contact strips mounted thereon, each of the drums coöperating with selected groups of said contact fingers, speed-modifying means mechanically connecting the drums to one another, and means for continuously rotating said drums whereby they engage their selected contact fingers at different rates of speed.

8. A controller comprising a plurality of groups of stationary contact members, a plurality of rotatable drums having other contact members mounted thereon, each of said drums coöperating with selected groups of said stationary contact members, and means for continuously rotating said drums at different speeds in order to vary the rate of contact with their associated stationary contact members.

9. A controller comprising a plurality of peripherally spaced groups of contact fingers, a plurality of drums having contact strips mounted thereon, each of said drums coöperating with selected groups of said contact fingers, speed-modifying means for mechanically connecting the drums to one another, and means for rotating said drums whereby each engages its associated contact fingers at a different rate from the other drums.

10. A controller comprising two series of peripherally-spaced groups of contact fingers, two rotatable drums having alined axes and severally arranged to coöperate with the said series of groups of contact fingers, contact strips on said drums to coact with the selected contact fingers, and a gear train for mechanically connecting said drums to each other and varying their speeds of rotation whereby one drum effects engagement with its associated contact fingers at a different rate from the other drum.

In testimony whereof, I have hereunto subscribed my name this 29th day of Feb. 1916.

EDWIN LEHR.